March 17, 1953  C. G. A. JOHNSON, JR  2,631,907

VALVE

Filed Nov. 28, 1947

INVENTOR.
CARL G. A. JOHNSON JR.
BY
*Gauvad*
attorney

Patented Mar. 17, 1953

2,631,907

UNITED STATES PATENT OFFICE 2,631,907

VALVE

Carl G. A. Johnson, Jr., Mansfield, Ohio, assignor to The Ohio Brass Company, Mansfield, Ohio, a corporation of New Jersey Application November 28, 1947, Serial No. 788,367

6 Claims. (Cl. 309—43)

This invention relates to valves of the reciprocating piston type and used to a large extent in pipe lines conveying fluids such as, oil, gas, etc.

It is found when these valves which are of large size as a rule are installed such that the piston moves vertically in the body that the mere friction between the piston and body may not be sufficient to hold the piston in its upper position due to vibration of the pipe line or the fluid therein eliminating the effect of the friction.

This is true even though piston rings of the usual type are installed at the piston ends. Therefore one object of this invention is to provide means to increase the pressure of the ordinary split piston rings of metal against the inner surface of the body and thereby increase the friction such that the piston will be held in its upper position when installed for vertical movement to either its open or closed position.

While the following description of the rings shown in Figs. 2, 3, 4 and 5 relate to their use in connection with a valve, they may find use in other forms of apparatus.

Figure 1:
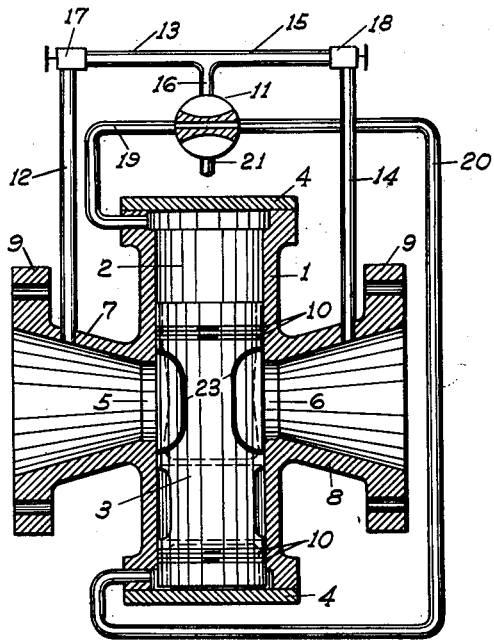
Fig. 1 shows a section of a valve of the piston type.

In Fig. 1 is shown a valve comprising a body or cylinder 1 having a bore 2 in which is mounted the reciprocating piston 3 shown in a closed position and having a sliding fit with the body or cylinder 1.

The body has cylinder heads 4 and oppositely disposed ports 5 and 6 and extension portions 7 and 8 respectively, provided with flanges 9.

At the ends of the piston 3 are shown piston rings 10 which may be one or more in number and intermediate the piston ends.

To operate the piston to open and close the valve a control valve 11 is provided which is connected by the pipes 12, 13, and 16 to extension 7 and by pipes 14, 15 and 16 to extension 8 whereby fluid pressure may be supplied to the control valve 11.

The valves 17 and 18 control the supply of fluid pressure to the control valve 11 and are normally left closed and either one opened depending upon from which port it is desired to secure fluid pressure.

To supply the fluid pressure from the valve 11 to the bore 2 the control valve is connected to one end of the cylinder 1 by the pipe 19 and to the other end of the cylinder by the pipe 20.

If it is desired to take fluid pressure from the extension member 7 which may be connected to the supply line the valve 17 is opened and the valve 18 left closed. The valve 11 is then operated clock-wise if it is desired to supply fluid pressure to the lower end of the bore to move the piston 3 to its upper or open position whereby the through port 22 in the piston connects the ports 5 and 6 in the body 1.

As the piston moves up or to its open position the upper end of the bore is connected to atmosphere by pipe 19, valve 11 and pipe 21.

When the opening operation of the piston is completed the valve 11 is returned to its normal position as in Fig. 1 and the valve 17 closed. The two ends of the bore are now connected thereby equalizing the pressure in the two ends of the bore and preventing movement of the piston due to the building up of pressure in one end only.

The piston 3 is provided with packing 23 which surrounds the ports 5 and 6 when the piston is in its closed position.

If it is desired to operate the piston to its closed position the valve 11 is operated anti-clock-wise and if it is desired to use fluid pressure from the extension member 8 then the valve 18 is opened and the valve 17 left closed and the other operations are as previously explained.

Figure 2:
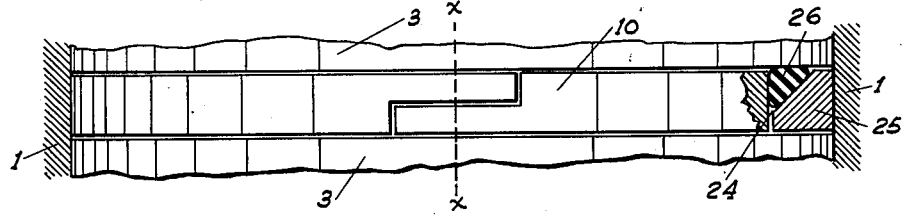
Fig. 2 is an enlarged portion at one end of the piston showing one of the piston rings of Fig. 1 in partial section.

In Fig. 2 is shown a piston ring 10 comprising two members, a metal ring 25 and a non-metallic ring 26 of resilient or elastic material such as rubber or of other suitable material such as synthetic substitutes for rubber and certain plastics.

Figure 3:
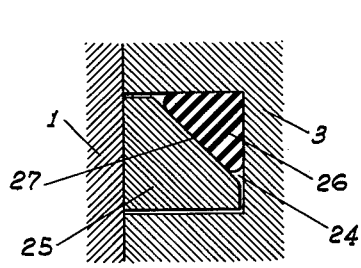
Fig. 3 is a still larger transverse section of the ring shown in Fig. 2.

The ring member 25 is of metal and may be formed with lapped ends or they may be of other form. In Fig. 3 is shown an enlarged transverse section of ring 10 with reference to the annular groove 24 in the piston 3, and the wall of the body 1.

The ring 26 may be formed with a round or other suitable cross-section and of a length to encircle the groove 24. If the ring 26 is of a continuous or unbroken length it may be stretched over the piston and into place in the groove or it may have abutting ends.

The ring 25 is of metal having the usual normal outside diameter a little greater than the diameter of the bore 1 and piston 3 and is sprung into place in the groove 24 and therefore will exert a certain amount of pressure upon the wall of the body and thereby provide a certain amount of friction but this is often not sufficient to accomplish the desired result of sustaining the piston in its upper position when the valve is subjected to vibration.

It may not be possible to provide a metal ring 25 of sufficient pressure against the body or cylinder wall and to spring the same into the groove 24 but by use of the ring 26 of resilient or elastic non-metallic material, the metal ring 25 of normal construction may be used and the ring 26 which is under compression will greatly increase the pressure of ring 25 against the cylinder wall and hold it tightly thereto.

In Figs. 2 and 3, the inner face 27 of the ring 25 is angularly disposed to the side faces of the ring 25 and to the axis of revolution x—x of the ring 25. In this construction the weight of the piston acting upon the ring 26 will add to the force exerted by the normal compression of the ring 26 by further increasing that compressive force acting upon the ring 25 in a direction radial to the axis x—x.

At the same time with a proper construction of the rings 25 and 26 and their relations to each other and a proper number of rings 10 the piston may be supported by the rings 26 which in turn are supported by the angled faces 27 leaving the rings 25 free of the side faces of the grooves but tightly pressed against the wall of the cylinder 1, as in Fig. 3.

This pressure will create static friction between the rings and wall of the bore, which together with the friction between the piston and bore wall, will be sufficient to support the piston; but if the static friction between the rings and cylinder wall is broken, the weight of the piston will cause it to move down. However, since the rings 25 contact the body 1 they are free to vibrate with the body and the same periodic vibration and therefore the static friction will not be affected to the point of permitting movement of the piston through its weight.

The ring 26 being of non-metallic material, say rubber, it will tend to absorb much vibration.

Figure 4:
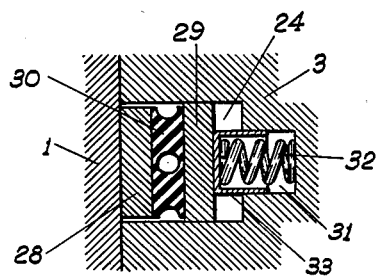
Fig. 4 is a transverse section of another form of piston ring as installed in a groove in the piston and held firmly against the body surface.

Fig. 4 shows a cross-section of another means of accomplishing the support of the piston under vibration forces. Here the piston ring comprises two split metal rings 28 and 29 held in spaced relation by the non-metallic insert ring 30 which is preferably secured to their faces. This ring may be of rubber or other resilient or elastic material. The rings 28 and 29 are split as in ring 25 and sprung into place in the groove 24. The ring 28 is preferably of a less width than that of the groove 24 while the ring 29 has a sliding fit therein.

Positioned around the piston are a plurality of pockets 31 opening into the groove 24 and in each pocket is a spring 32 held against the ring 29 by the interposed cap 33.

The ring 28 is pressed against the cylinder wall by its own normal pressure and that of the ring 29 which acts through the insert ring 30 and in addition the force exerted by the springs 32. Ring 28 is thus held firmly against the cylinder wall by friction and by proper construction, adjustment and relation of the parts, and with a proper number of piston rings the weight of the piston will be supported even in case of vibration in the valve body 1 which will be transferred to the ring 28 and the frictional hold remain unbroken.

In this type of piston ring the weight of the piston will be transmitted to ring 28 through the ring 29 and interposed ring 30, the latter tending to absorb at least some of the vibration set up in the ring 28.

Figure 5:
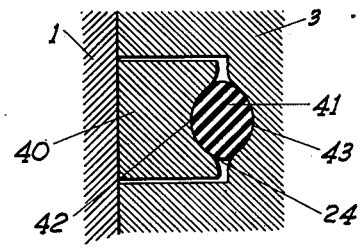
Figs. 5 and 6 are transverse sections of other forms of this invention.
Figure 6:
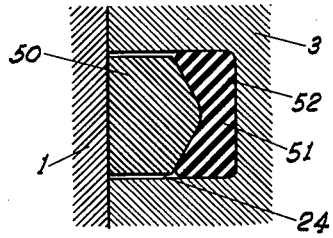

In Figs. 5 and 6 are shown two other forms of this invention and which function with the valve in any position.

In Fig. 5 the piston ring is composed of two members, the metal ring 40 having split ends as in Fig. 2 and a non-resilient ring 41 as in the case of the other forms of this invention. The ring 40 is provided with a groove 42 in which rests the ring 41 and the bottom face of the groove 24 is also provided with an auxiliary groove 43 to receive the ring 41.

Here the ring 40 has its normal pressure against the cylinder wall which is further increased by the compressive force of the ring 41, which is compressed from a normally round or other suitable cross-section to that shown or other shape depending on the shape of the grooves 42 and 43.

In Fig. 6 the piston ring comprises the metal ring 50 and non-metallic ring 51 interposed between the inner face of the ring 50 and the bottom face of the groove 24. The inner face of the ring 50 is angularly disposed in opposite direction from a center line around the ring 50 and the two faces form an obtuse angle, each face being angularly disposed to an axis of the ring 50 similar to the axis x—x of Fig. 2.

Here the pressure of the piston ring on the cylinder wall is the normal installed pressure of the ring 50 and added to that is the stored-up compression force in the ring 51. The normal cross-section of the ring 51 may approximate somewhat that shown in Fig. 6 or may even be rectangular in shape before compression.

In both Figs. 5 and 6, the total static friction tending to prevent movement of the piston as a result of vibration in the body 1 is that of the piston ring described above and with proper construction of the metal ring and the non-metallic ring and their relative relation and with a proper number of such piston rings, the piston 3 in each case will be prevented from inadvertant movement as a result of a vibrating body 1.

Herein and in the claims when the term piston ring is used it is intended to cover a complete ring namely the metal ring and the non-metallic ring.

I claim as my invention:

1. In a valve comprising a body member having a cylindrical bore and a reciprocating piston mounted therein and having a plurality of annular grooves in the surface thereof and a piston ring positioned in the grooves and each piston ring being of reduced width relative to the grooves for receipt in said grooves in spaced relation to the groove-defining side walls of the piston and having a split yieldable metal ring of greater normal diameter than that of the piston with its outer face contacting with the adjacent face of the cylindrical bore, and the inner face of the metal ring provided with two angularly disposed surfaces forming an angle thereby, the combination with each ring of auxiliary means comprising an elastic rubber body associated with the metal ring and groove and positioned between and bearing against the groove-defining side walls of the piston and the said angularly disposed surfaces of the ring, the said auxiliary means being under compression when the other said parts are assembled and acting upon the metal ring whereby the normal diameter of the metal ring will be increased and the ring forced against the said adjacent face of the cylindrical bore with greater pressure than the inherent pressure of the metal ring.

2. A reciprocating piston for a valve body in which the piston is to float and be subject to a constant force tending to move the piston in one direction, comprising a cylindrical member with a transverse opening or port therethrough, the wall of the piston provided with an external annular groove, a piston ring positioned in the groove, the said piston ring comprising a yieldable metal ring having a normal diameter greater than that of the cylindrical member, and being of reduced width relative to the grooves for receipt in the said grooves in spaced relation to the groove-defining side walls of the piston, the inner face of the metal ring being angularly disposed to the side faces of the metal ring to face away from the direction in which the constant force will tend to move the piston, an elastic rubber ring positioned between the said angularly disposed face and the adjacent bottom wall and side wall faces of the groove to resiliently support the metal ring against the constant force in spaced relation to the side wall faces of the said groove, the said metal and rubber rings being so constructed and related as to effect an increase in the diameter of the metal ring when the last said rings are assembled in the groove.

3. In a valve comprising a body member having a cylindrical bore and a reciprocating floating piston therein having a plurality of annular grooves in its outer surface and being constantly subject to a force tending to move the piston in one direction, the combination of a split yieldable piston ring in each groove, said piston rings each being of greater normal diameter than the piston and having an outer face engaging the opposing face of the cylindrical bore and a substantially flat inner face portion angularly opposed to side and bottom walls of said groove and disposed diagonally relative to said outer face and facing away from said direction of piston motion, and each said ring further being of reduced width relative to said grooves for receipt in the said grooves in spaced relation to the groove-defining side walls of the piston, and an annular elastic rubber body in each said groove and deformed between said side and bottom walls and said inner face portion and resiliently supporting each ring against said constant force in spaced relation to the groove-defining piston side walls.

4. In a valve comprising a body member having a cylindrical bore and a reciprocating piston mounted therein and having a plurality of annular grooves in the surface thereof, the combination of a split yieldable piston ring in each groove, said piston rings each being of greater normal diameter than the piston and having an outer face engaging the opposing face of the cylinder bore and an inner face, said inner face having two portions angularly opposed to each other and to walls of said groove and disposed diagonally relative to said outer face, and said piston rings being of reduced width relative to said grooves for receipt in said grooves in spaced relation to the groove-defining side walls of the piston and an annular elastic rubber body in said groove and deformed between said groove walls and said inner face portions.

5. A reciprocating piston for a valve body in which the piston is to float and be subject to a constant force tending to move the piston in one direction comprising a cylindrical member with a transverse opening or part therethrough, the wall of the piston provided with an external annular groove, a piston ring positioned in the groove, the said piston ring comprising a yieldable metal ring having a normal diameter greater than that of the cylindrical member and an outer face to engage said member and having an inner face, said inner face having a portion angularly opposed to side and end walls of said groove and disposed diagonally relative to said outer face to face away from the direction in which the constant force will tend to move the piston and said piston rings being of reduced width relative to said grooves for receipt in said grooves in spaced relation to the groove-defining side walls of the piston, and an annular elastic rubber body deformed between the end wall and a side wall of the groove and said inner face portion of the metal ring to resiliently support the metal ring against the constant force in spaced relation to the groove-defining side walls of the piston.

6. A reciprocating piston for a valve body comprising a cylindrical member with a transverse opening or part therethrough, the wall of the piston provided with an external annular groove, a piston ring positioned in the groove, the said piston ring comprising a yieldable metal ring having a normal diameter greater than that of the cylindrical member and having an outer face to engage said member and an inner face, said inner face having two angularly disposed surfaces defining an acute included angle and extending diagonally relative to said outer surface and said piston rings being of reduced width relative to said grooves for receipt in said grooves in spaced relation to the groove-defining side walls of the piston and an annular elastic rubber body in said groove and deformed between the side and end walls of said groove and said angularly disposed surfaces of the metal ring.

CARL G. A. JOHNSON, Jr.

REFERENCES CITED

The following references are of record in the file of this patent:

UNITED STATES PATENTS

| Number | Name | Date |
| --- | --- | --- |
| 421,646 | Ambrose | Feb. 18, 1890 |
| 788,769 | Harsen | May 2, 1905 |
| 1,239,726 | Sauer et al. | Sept. 11, 1917 |
| 1,385,508 | Trembley | July 26, 1921 |
| 1,512,746 | Hagan | Oct. 21, 1924 |
| 2,337,841 | Shafer | Dec. 28, 1943 |
| 2,509,672 | Christensen | May 30, 1950 |

FOREIGN PATENTS

| Number | Country | Date |
| --- | --- | --- |
| 522,024 | Great Britain | June 6, 1940 |